Nov. 11, 1924.
M. W. BROWNE
1,515,546
COLD STORAGE SYSTEM
Filed May 9, 1923   3 Sheets-Sheet 3
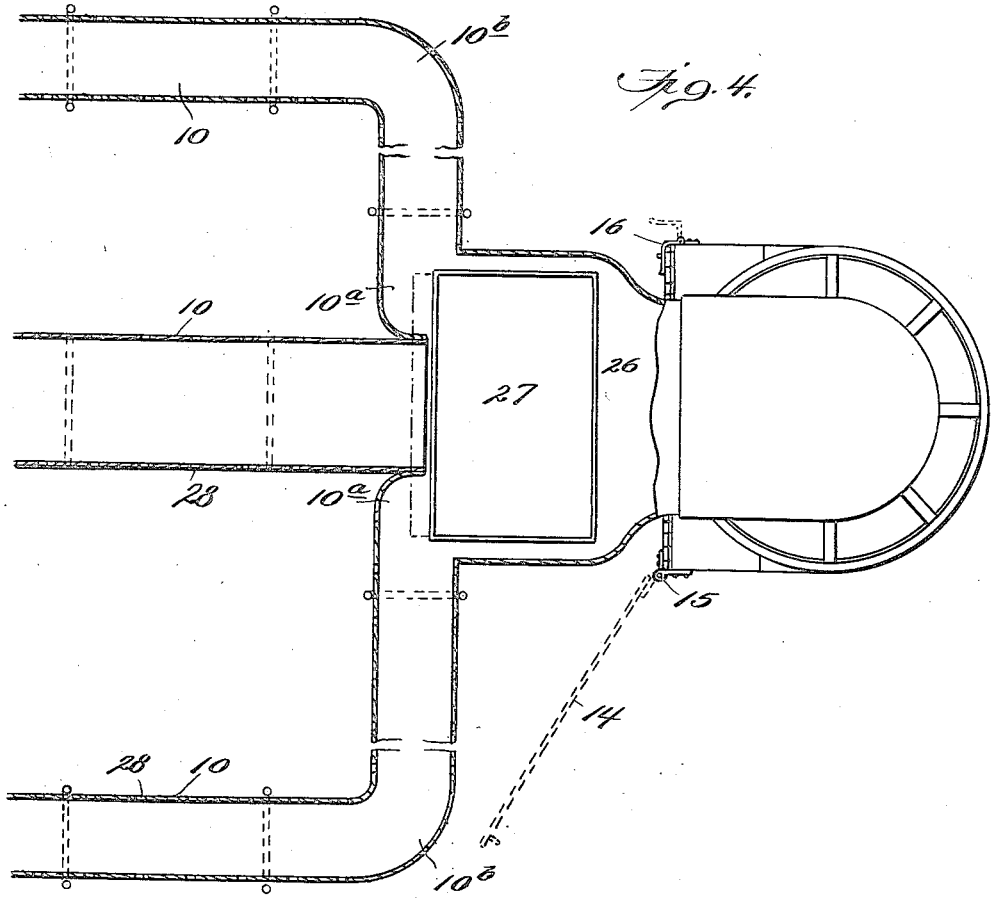
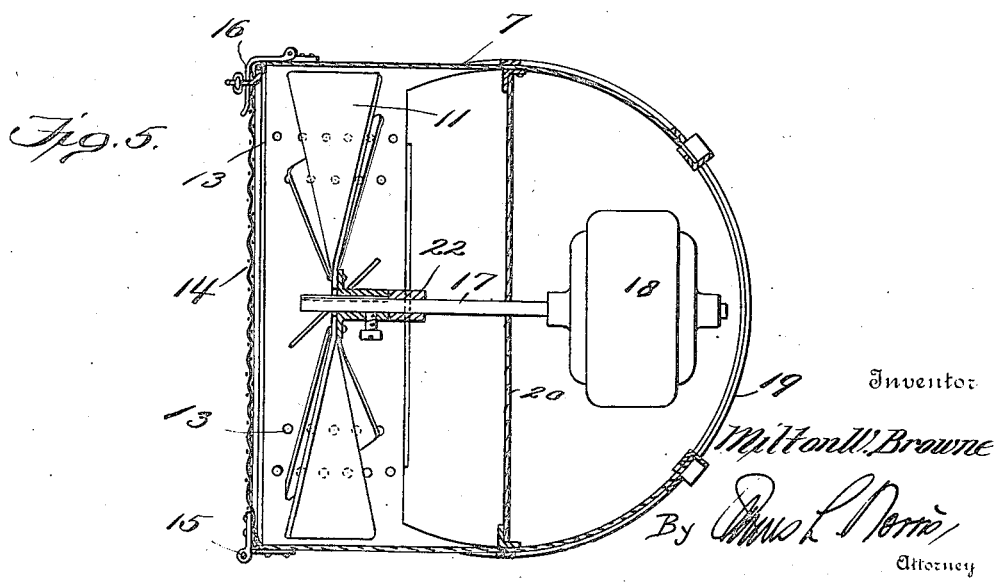

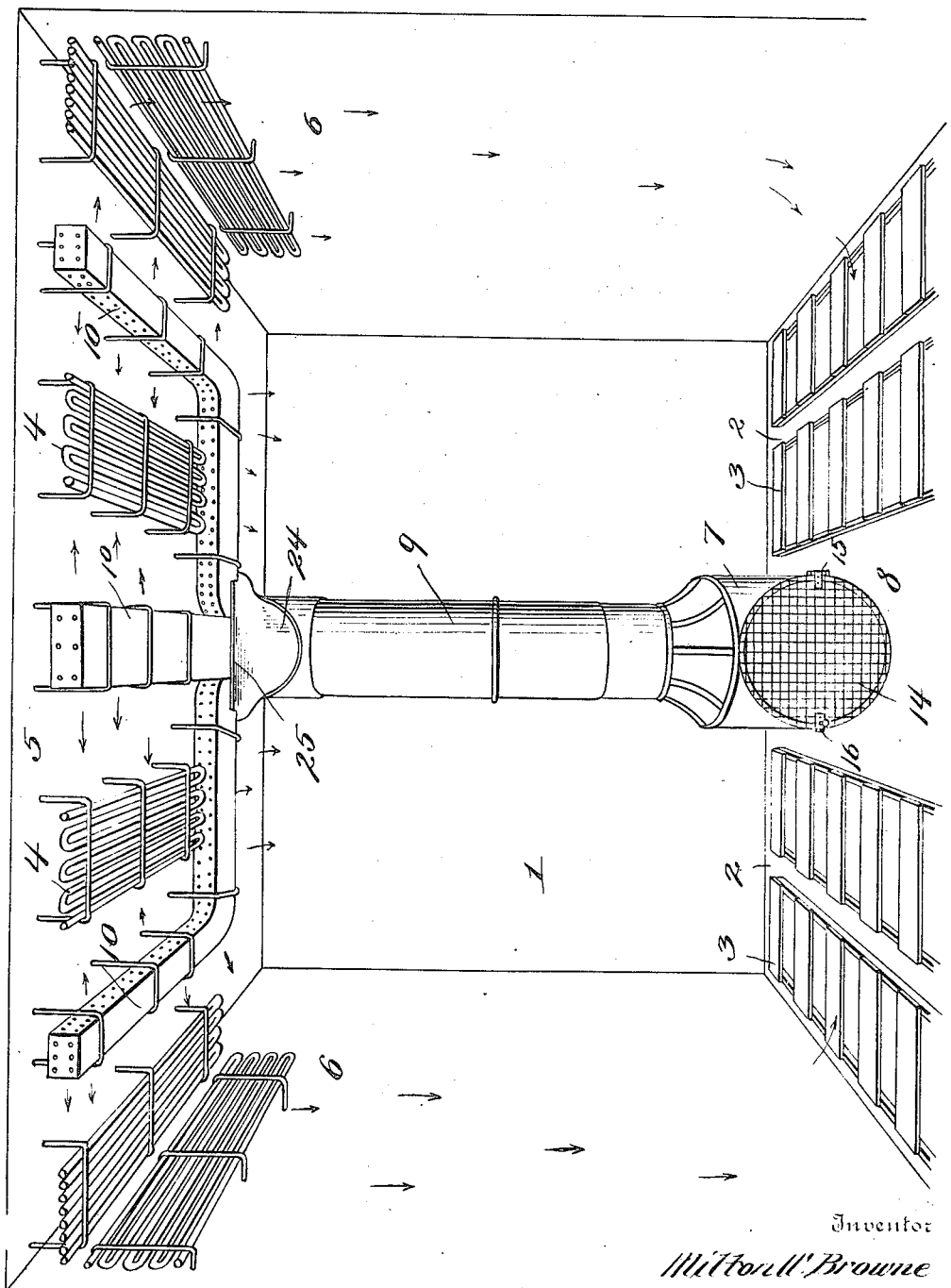

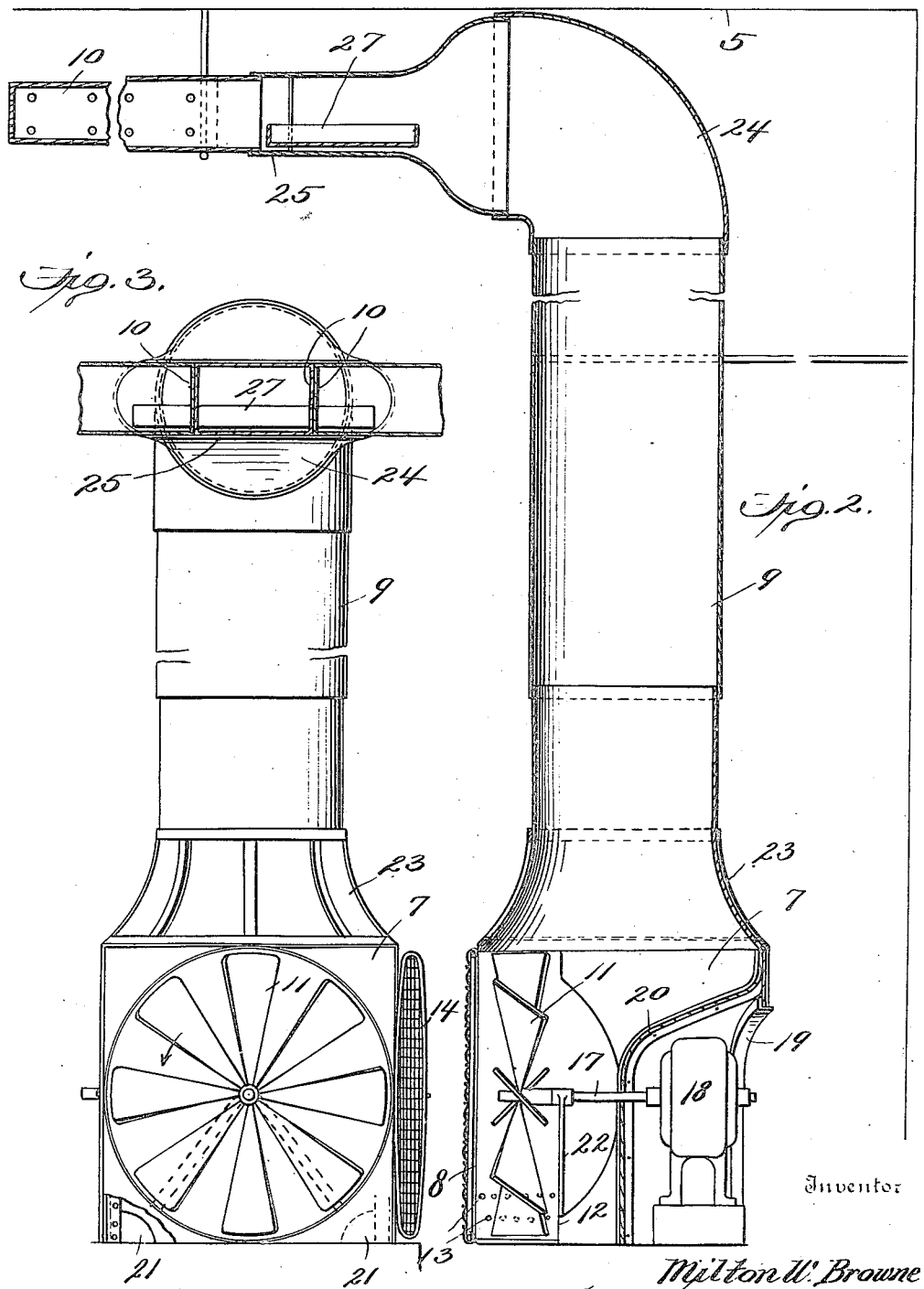

Patented Nov. 11, 1924.

1,515,546

UNITED STATES PATENT OFFICE.

MILTON W. BROWNE, OF KANSAS CITY, MISSOURI.

COLD-STORAGE SYSTEM.

Application filed May 9, 1923. Serial No. 637,758.

*To all whom it may concern:*

Be it known that I, MILTON W. BROWNE, a citizen of the United States, residing at Kansas City, in the county of Jackson and State of Missouri, have invented new and useful Improvements in Cold-Storage Systems, of which the following is a specification.

The present invention relates to improvements in refrigeration or cold storage and more particularly to the refrigeration or cold storage of eggs, meats, butter, fresh fruits and vegetables, as well as all other perishable food products, it being the primary object of the invention to provide a novel and improved system, whereby the temperature within a refrigerating or cold storage room is maintained uniform, or substantially so, throughout the room, and the humidity is so controlled that the accumulation of excess moisture about the products undergoing refrigeration or cold storage, is prevented, to the end that food products may be stored successfully for much longer periods than has heretofore been possible, and that the flavor, weight and other natural qualities of the products will be preserved substantially without change or loss.

To these and other ends, the invention consists in certain improvements and combinations and arrangements of parts, all as will be hereinafter more fully described, the features of novelty being pointed out particularly in the claims at the end of the specification.

In the accompanying drawings:

Figure 1 is a view of a refrigerating or cold storage room equipped with apparatus suitable for use in carrying out the present invention;

Figure 2 is a detail view, on an enlarged scale and in section, of the main conduit of the air circulating means;

Figure 3 is a view in elevation of the air circulating means shown in Figure 2 and as viewed from the left thereof, the middle portion of the upright conduit being broken away;

Figure 4 is a top plan view partly in section of the air circulating means shown in Fig. 2, illustrating portions of the main and branch air distributing pipes; and Figure 5 represents a section taken horizontally through the lower portion of the conduit, showing the means for drawing air into the conduit and forcing it upwardly therein.

Similar parts are desginated by the same reference characters in the several views.

The present invention is applicable generally to the refrigeration or cold storage of products of various kinds, but it is more especially applicable to the refrigeration or cold storage of perishable food products of various kinds which require the presence of the proper amount of air, the proper relative humidity, and correct uniform temperature, for their preservation.

Heretofore, gravity alone has been generally depended upon for the movement or distribution of air within a refrigerating or cold storage room, but it has been found that in using such systems, excessive moisture and dampness accummulate, which causes deterioration and often molding of the products undergoing storage, the products are not supplied to the proper degree with air, and, furthermore, the temperature in different portions of the room varies greatly, there being relatively warm air pockets in the corners and upper portions of the room, while the temperature at or near the floor will frequently be much below the correct temperature for the proper storage of the products; and hence in such refrigerating or cold storage systems as heretofore used the length of the period during which products, especially fruits and vegetables, can be stored is relatively short, and, furthermore, in using such systems there has been a considerable loss in weight, flavor and other natural qualities of the products.

According to the present invention, a forced air circulation is produced and maintained within the refrigerating or cold storage room which affords ample aerations of the fruits and vegetables, it prevents the accumulation of excessive moisture or dampness, although maintaining the proper relative humidity for the preservation of the products, and it insures substantially uniform temperature throughout the room, so that the fruits and vegetables, or other perishable food products contained therein may all be subjected uniformly to the most advantageous temperature conditions.

The apparatus may be installed in refrigerating or cold storage rooms of various dimensions, the capacity of the apparatus being suitably preportioned to the cubic contents of the room. In the present instance, Figure 1 shows the preferred embodiment of the invention applied to a refrigerating or cold storage room 1 which has a floor 2 on which the products to be refrigerated or stored may be supported. Preferably the products are placed upon racks or false floors 3 which provide spaces beneath and through them for the free circulation of air. Refrigeration is obtained in any suitable way, but preferably by refrigerating pipes 4 which may be arranged immediately below the ceiling 5 of the room and on the upper portions of the opposite side walls 6, the number of refrigerating pipes being suitably proportioned to the size of the room. The groups or coils of refrigerating pipes at the ceiling of the room are preferably arranged in parallel rows, as shown.

The means shown in the present instance for creating a forced air circulation and for controlling the humidity within the room, as well as to afford adequate aeration of the products in storage comprises preferably and as shown in the present instance, a housing 7 which may be located at or near the floor level of the room and having an air induction opening 8 through which air at or near the floor level is forcibly drawn into the apparatus, an upright conduit 9 which receives such air from the housing 7, and air distributing pipes 10 which receive the air from the upright conduit and direct it at or near the ceiling of the room against the groups or coils of refrigerating pipes, whereby the air is cooled, after which it gravitates, by reason of its increased density, to the lower portion and floor of the room, to be taken up again by the air forcing apparatus, so that a continuous circulation of air in the room is maintained. In this way the products in storage are sufficiently aerated at all times, thus prolonging their life, there is no opportunity for excess moisture or dampness to accumulate in or about the products, so that spoilage or deterioration, due to mold or other causes, is prevented, and furthermore, the maintenance of an equal temperature throughout the room is attained, so that no warm air pockets can form, nor can an abnormally low temperature exist at or immediately above the floor level.

Air inducing means of different kinds may be used in the housing 7. Preferably and as shown in the present instance, a revolving bladed fan 11 is used which is located immediately within the opening 8 in the housing, through which the main body of air is drawn from at or near the floor level of the room, the fan being of a size to give it a capacity suitable for the size of the room and it having in the present instance a surrounding guard 12, which is preferably formed in its lower portion with openings 13, through which air from the bottom of the housing 7 may enter and be propelled upwardly through the conduit 9 by the fan. The main opening 8 may be covered by a woven wire or other foraminous door 14, the door being preferably hinged at one side to the housing, as at 15, and provided with a catch 16, at its opposite side, the hinged door permitting access to the fan structure. The fan may be driven in any suitable way, it being shown in the present instance as driven by the shaft 17 of an electric motor 18, the latter being preferably located in one side of the housing 7, the latter having an opening 19 opposite to the motor to permit access to the latter and a partition 20 is provided in the housing to separate the motor chamber from the fan chamber. The lower corners of this partition may be cut away, as at 21, to permit air to flow from the bottom of the motor chamber into the fan chamber.

Also a bracket 22 may be provided to support the fan shaft 17 at a point near the fan. The top of the housing 7 is preferably formed with a neck 23 which forms an outlet of reduced diameter, and the conduit 9 which may be composed of sheet metal of suitable thickness is riveted or otherwise attached to the neck 23, this housing being of a suitable height to reach nearly to the ceiling 5 of the room, at which point it is provided with an elbow 24 which has a mouth 25 which is broadened laterally or horizontally and is reduced in vertical height to form a relatively broad chamber 26 to contain a shallow water pan 27 and to adapt the elbow for the attachment of the air distributing pipes 10. As shown in Figure 4, one of the air distributing pipes 10 (the central one) may lead directly from the mouth of the elbow, while the pipes at opposite sides thereof have bent ends $10^a$ which are connected to the mouth of the elbow and then proceed laterally in opposite directions for suitable distances and then bent, as at $10^b$ to bring these pipes into parallelism with the central pipe. The air distributing pipes which are provided in their two vertical sides and their ends with air discharge openings 28, are arranged immediately below the ceiling of the room and they extend longitudinally between the groups or coils of refrigerating pipes 4, these distributing pipes lying in the same plane with the refrigerating pipes or being otherwise suitably arranged so that the air discharged laterally from the openings in the distributing pipes will reach or pass the refrigerating pipes and in so doing the air will be cooled.

In carrying out the invention with an apparatus constructed as hereinbefore described, the refrigerant is supplied in the usual way to the groups or coils of refrigerating pipes 4 and the fan is driven continuously by the electric motor or other suitable means. The fan operates to forcibly draw the air at or near the floor level of the room through the main opening 8 in the casing 7 and to force this air upwardly through the conduit 9 and thence into the perforated air distributing pipes 10, from which the air is projected against or past the refrigerating pipes, this air being thereby cooled and by reason of its increased density it gravitates to the floor of the room to be again drawn into the fan housing, elevated to the ceiling level and recooled, a continuous circulation of the air throughout the room being thereby maintained.

It has been found that by using a forced air circulation and humidity control apparatus constructed substantially as herein shown and described, a rapid air circulation to and from all parts of the room is maintained continuously, this circulation of air carrying off from the fruits and vegetables the excessive moisture, offensive odors, carbon dioxide and the like, the odors and gases being absorbed by the moisture which becomes frozen on the refrigerating pipes, thus giving the products a forced circulation of clarified air which they absorb and which prolongs their life, thus enabling fruits and vegetables to be stored, without deterioration, much longer than is possible with the systems heretofore used generally and which depend wholly upon gravity for air circulation. Moreover, the forced circulation of air avoids accumulation of excess moisture in or about the fruits and vegetables, so that dampness, mold or similar destructive influences which in those systems depending wholly upon gravity, cause rapid deterioration of the products, are avoided. Also, according to the present invention, uniform temperature throughout the room is maintained, by reason of the forced circulation of air, so that all of the products in storage may be subjected uniformly to the most efficient refrigerating temperature, and the requisite relative humidity to prevent wilting because of insufficient moisture, and decay because of excessive humidity, and to preserve the natural flavor and prevent loss of weight of the fruits and vegetables, is maintained, water, if necessary, being supplied to the water pan 27 to supply any deficiency in moisture, while, as previously stated, the accumulation of excess moisture on or about the products is avoided.

Other food products may also be stored, in accordance with the present invention, more successfully and for longer periods than is possible with the gravity systems heretofore used, this being particularly true with eggs which have heretofore given much trouble to cold storage concerns, owing to the difficulties presented in storing them under the gravity system, due to the inability of the gravity system to maintain the proper relative humidity and uniform temperature and to provide the requisite aeration, in consequence of which, eggs, as heretofore stored, have absorbed deleterious flavors. If insufficient humidity exists, eggs, and also meats, butter and all other perishable food products will undergo excessive shrinkage in weight; and, on the other hand, if the humidity is excessive, these products will mold and decay. The present invention enables all such defects and disadvantages to be avoided, it insuring the maintenance of uniform temperature, the proper relative humidity and the proper air circulation through and in all parts of the cold storage or refrigerated room.

I claim as my invention:—

1. The method of maintaining air circulation and controlling humidity in cold storage and refrigerated rooms having products in storage in the lower portion thereof, which comprises forcibly and continuously withdrawing moisture-laden air from the lower portion of the room and conducting it, while out of contact with the body of air in the room, to the ceiling thereof, liberating such air in a plurality of zones which are distributed across the ceiling of the room, and refrigerating such air liberated in said zones, thereby causing the resulting refrigerated air to descend by gravity from the refrigerating zones at the ceiling, through the room and to the lower portion thereof to take up heat, moisture and gases from the products in storage and to be again withdrawn therefrom and conducted to the ceiling of the room for refrigeration.

2. In a refrigerating or cold storage room, the combination with a series of air refrigerating means distributed across the ceiling thereof, of a conduit having an inlet at substantially the floor level of the room, means for drawing air from the lower portion of the room into the inlet of the conduit and for forcing such air upwardly therein, and air distributing means connected to receive the air forced upwardly in the conduit and operative to project such air against the series of distributed refrigerating means, the space in the room beneath the refrigerating means providing an unobstructed chamber through which the air, after cooling thereof by the refrigerating means, is caused to descend directly and by gravity to the lower portion of the room.

3. The combination with a refrigerating or cold storage room forming a single closed chamber for the storage of products in the lower portion thereof, of refrigerating pipes distributed across the ceiling of the room, an air conduit extending from the lower to the upper portion of the room and having an inlet for the admission to the conduit of air from the lower portion of the room, means for forcing such air upwardly within the conduit, and means connected to receive the air thus forced upwardly and operative to project such air against the refrigerating pipes at intervals in the lengths thereof and in zones which are distributed uniformly across the ceiling of the room.

4. The combination with a refrigerating or cold storage room having a series of air-refrigerating means distributed across and located adjacent to its ceiling, of a housing located adjacent to the floor level of the room and having means for drawing air into it from at and near the floor level of the room, a conduit leading upwardly from said housing for conducting air from the housing to the ceiling of the room, and a series of air distributing pipes distributed across and located adjacent to the ceiling of the room, said pipes being connected to receive air from said conduit and arranged to discharge the air toward and in the zones of the respective air-refrigerating pipes.

In testimony whereof I have hereunto set my hand.

MILTON W. BROWNE.